Sept. 8, 1959 C. H. KRELLNER 2,903,666

RESISTORS WITH INTEGRAL MOLDED METAL TERMINALS

Filed Aug. 23, 1955

INVENTOR.
CLEMENT H. KRELLNER
BY
Emery, Varney, Whittemore & Dix
ATTORNEYS

United States Patent Office 2,903,666
Patented Sept. 8, 1959

2,903,666

RESISTORS WITH INTEGRAL MOLDED METAL TERMINALS

Clement H. Krellner, Bradford, Pa., assignor to Speer Carbon Company, Saint Marys, Pa., a corporation of New York Application August 23, 1955, Serial No. 530,077

7 Claims. (Cl. 338—330)

This invention relates to molded electric resistance units, or resistors, such as are widely used in electronic devices. More particularly the invention relates to resistors which comprise a resistor body molded from a powdered material of relatively high resistance, for example of carbon composition, and integral metal terminals molded in situ from metal powder at the same time that the resistance material is molded.

The usual fixed value carbon composition resistor comprises a molded elongated body of resistor material having flexible wire leads embedded in and projecting axially for some distance from the ends thereof. For printed circuits, which are coming increasingly into use in radio, television, amplifiers, computer equipment and other electronic devices, this resistor construction is bulky and inconvenient to handle and install. Resistors with flexible wire leads are not adapted to hopper feeding and are difficult to adapt to automatic feeding of any kind. They are difficult to position automatically in precise location with respect to other parts of the circuit prior to being soldered in place. In some cases it has been found necessary to bend the wire leads of the resistors at right angles close to the body of the resistors, and then push the bent leads through the proper holes in the circuit board and clinch them to hold the resistors in position until the soldering has been performed. Desirably the resistors, as well as all other electronic components, should be capable of being readily fed to and positioned on the circuit board automatically, and the whole assembly should be capable of being dipped into molten solder to make all of the soldered joints simultaneously.

It is an object of the invention to provide improved resistors suitable for use in electronic circuits. It is another object of the invention to provide molded resistors which are suitable for hopper feeding, and which are adapted for automatic positioning in circuit assemblies. It is another object of the invention to provide resistors which are small in size and which may be manufactured economically. It is a further object of the invention to provide molded resistors having metal terminals integrally molded on the resistor. It is another object of the invention to provide molded carbon composition resistors having rigid metal ends integrally molded thereon. It is still another object of the invention to provide fixed resistors having integral end terminals suitable for dip soldering in the making of connections thereto. It is yet another object of the invention to provide a molded resistor having integrally molded metal ends which are firmly secured to the resistance material, to which soldered connections may be readily made, and which exhibit a low resistance change after soldering. It is a further object of the invention to provide a method for making the new and improved resistors of the present invention. Other objects, features and advantages will become apparent or will be pointed out as the description proceeds.

A preferred embodiment of the invention selected for purposes of illustration and description is shown in the accompanying drawings, wherein.

Figure 1:
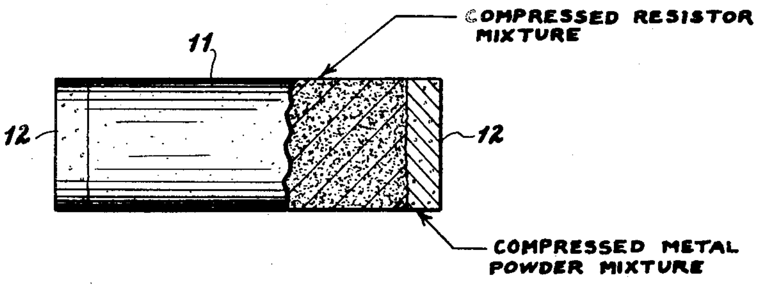
Figure 1 is a side elevation to considerably enlarged scale of a molded cylindrical resistor made in accordance with the present invention.

Referring to the drawings, Figure 1 is a view to substantially enlarged scale of one form of resistance unit made according to the present invention. The molded body of resistor material is indicated at 11 and the integral molded metal terminals are shown at 12. The resistor body 11 normally will be in the form of a rod, for example cylindrical in transverse section, and the metal terminals 12 will be of substantially similar shape and dimension, but each considerably shorter than the resistor body.

The molded resistor body 11 will be made in accordance with known practice from a mixture of suitable proportions of (1) material of high specific resistance, for example calcined carbon black, or graphite, or both, (2) filler material, for example silica powder, and (3) a binder, for example a thermosetting resin of the phenol-formaldehyde type. These materials are thoroughly blended to constitute the resistor mix. By varying the proportion of the first item in the mix the resistance of the finished resistor may be changed.

The molded metal terminals 12 will be made from metal powder. This metal powder must bond securely together and to the resistor mix under the molding pressures and curing conditions which are to be employed, so as to provide molded terminal members of high mechanical strength firmly secured to the ends of the resistor body. The metal terminals should be capable of being quickly and easily soldered in circuits and to the leads of other electronic components with little change in the resistance during the soldering operation. It is particularly desirable that the resistance units be capable of having connections made thereto by a dip soldering process in which the resistors will be dipped into molten solder, for example at a temperature of about 400° F. for a matter of 15 seconds, or so.

Applicant has discovered that certain metal powders can be molded onto the ends of carbon composition resistors at the same time that the resistors are molded to provide mechanically strong terminals which are securely attached to the resistor body and which can be easily soldered. The composition of the metal powder may vary somewhat, but the metal particles should be of such shape and size that they can be molded into firm self-sustaining bodies under the pressures to be employed in molding the resistor bodies. Electrolytic metal powders have been found peculiarly suited for this purpose.

Applicant found that a terminal molded from electrolytic copper powder having a dendritic or fern-like form will be a mechanically strong terminal. However, this all copper terminal tends to tarnish rather quickly in the atmosphere, which makes it somewhat difficult to solder. Applicant has discovered that the addition of tin powder to the copper powder improves the solderability of the molded metal terminal. A mixture of 80% copper powder and 20% tin powder was found to give a molded terminal of good mechanical strength, but it still was not easy to solder. By further increasing the amount of tin powder in the mixture until there were substantially equal proportions of copper and tin a mechanically strong terminal firmly secured to the molded resistor was obtained, and this terminal had good soldering characteristics.

It was further found by applicant that the amount of tin in the last described mixture can be substantially reduced if a small proportion of lead powder is added to the mitxure of copper and tin powders, for example of the order of 1% of the mixture. However, introduction of the lead into the mixture lowers the melting point of the molded terminal and preferably lead should not be included in amount which reduces the melting point sufficiently to interfere with dip soldering the resistors. A preferred mixture comprises copper 79%, tin 20% and lead 1%.

Spray painting the ends of carbon composition resistors with a conducting silver paint made of fine silver powder in a vehicle that dried rapidly and volatilized almost completely when heated was tried, as was also a bronze powder paint. Neither of these resistors could be dip soldered.

Figure 2:
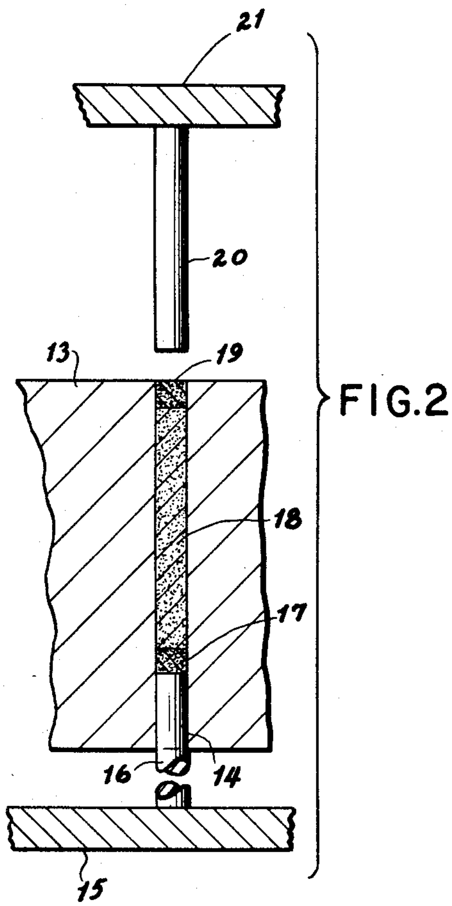
Figure 2 represents a vertical section through a mold showing the method of assembling the powdered metal and the powdered resistor material prior to being compressed in the molding operation.
Figure 3:
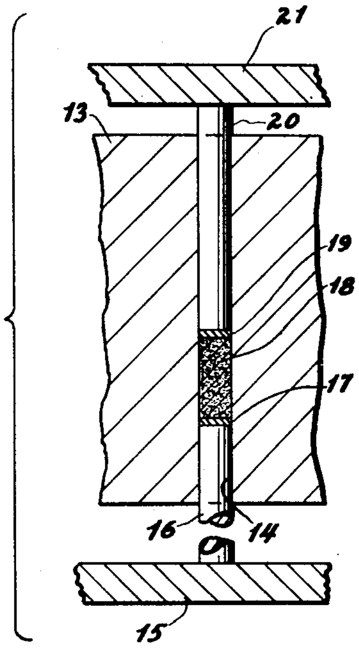
Figure 3 represents a vertical section through the mold similar to Figure 2, but showing the assembled materials after they have been compressed.

The method of producing the resistor of the present invention, having integrally molded metal ends, is illustrated more or less diagrammatically in Figures 2 and 3 of the drawings. The die block 13 has a vertical die opening 14 therethrough in which the resistor, including its terminals, will be molded. In the drawings a single die opening is shown, but in commercial practice the die block probably would be provided with a large number of symmetrically arranged die openings. The bottom plate 15 is provided with a stem 16 which fits into the die opening 14 with a close sliding fit.

With the stem 16 inserted part way into the die opening 14, as shown in Figure 2, a measured small quantity of metal powder 17 is poured into the die opening. When molded this will form one of the resistor terminals. On top of this metal powder is poured the correct amount of resistor mix 18, and on top of the resistor mix is placed an additional quantity of the metal powder 19 which will form the other terminal. In accordance with conventional practice the die block will be rapped or vibrated following the pouring in of each of these materials to insure settlement in uniform layers.

Next the pin 20 projecting from the top plate 21 is inserted in the die opening and hydraulic pressure is applied to the plates 15, 21 by a press, in known manner. The pressure employed will be sufficient to mold the resistor body and its terminals to the desired self-sustaining form and this may vary from a moderate pressure, for example about 1300 pounds per square inch, on up to pressures much higher, depending on the materials used, the dimensions of the resistors, and other factors. Following the molding operation the resistor will be ejected from the mold, for example by the stem 16 which is long enough to push the molded resistor out of the die block.

The molded resistors then will be cured in an oven to cause the resin to set. The curing temperature may vary depending on the particular thermosetting resin used, the time of curing, the size of the resistors, and other factors, but for phenol-formaldehyde resin may be in the neighborhood of 475° F. If desired, the curing may be done in a neutral (nitrogen) atmosphere, or in a reducing (hydrogen) atmosphere, although with the preferred compositions described hereinabove this was not found to be necessary to prevent oxidation of the metal terminals.

Following the curing operation the resistors desirably will be impregnated and coated with a wax or other resin to make them more resistant to the effects of moisture. This treating material may, for example, be of the type disclosed in the Veley Patent 2,313,853, March 16, 1943.

Merely as an illustration, one particular cylindrical shaped resistor made according to the present invention will be more particularly described. The resistor mix employed was a carbon composition and the metal powder for the terminals was a mixture of equal parts of dendritic electrolytic copper powder and tin powder. The cylindrical resistors were molded under a pressure of about 1300 pounds per square inch and then cured at a temperature of 475° F. in nitrogen. The finished resistor was approximately ⅜ of an inch in overall length and approximately ⅛ of an inch in diameter. The molded metal terminals were of the same shape as the resistor body and each approximately 1/32 of an inch in length. This resistor was rated at 2.2 megohms and ½ watt.

Figures 1–3 of the drawings show a resistor which is cylindrical in transverse section, but it has been pointed out hereinabove that this is merely illustrative. The transverse section of the resistor may be of other suitable shape, for example it may be a relatively flat rectangle. The last mentioned shape offers certain advantages in that it will be easier to arrange and feed from hoppers, may be more readily placed and soldered in the printed circuit, and will project only a short distance above the surface of the printed circuit.

Figure 4:
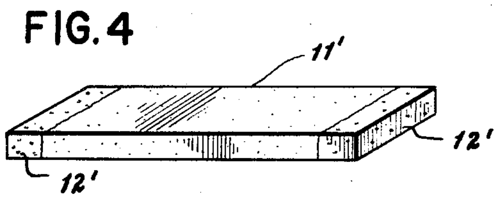
Figure 4 is a perspective of a molded resistor of different shape.

Figure 4 of the drawings shows a resistor which is similar to the resistor of Figure 1 except that in transverse section it is a relatively flat rectangle. The molded body of resistor material is indicated at 11′ and the integral molded metal terminals are shown at 12′. This resistor, and resistors of still other shapes, may be made in the same way as the cylindrical resistor by making the die openings in the die block, and the associated stems and pins, of suitable shape and size.

It will be understood that the invention herein disclosed may be variously modified and embodied within the scope of the subjoined claims.

I claim:

1. An electric resistor having a molded resistor body composed essentially of a mixture of conducting material of high specific resistance, a filler, and a binder, and metal terminals integrally secured to the resistor body, the terminals being formed exclusively from metal powder molded simultaneously with the resistor body while in direct contact therewith, the said metal powder consisting essentially of a mixture of copper powder and tin powder.

2. An electric resistor according to claim 1, in which the metal powder comprises substantially equal proportions of copper powder and tin powder.

3. An electric resistor according to claim 1, in which the metal powder includes a proportion of lead powder, the amount of tin powder being less than the amount of copper powder, and the amount of lead powder being less than the amount of tin powder.

4. An electric resistor according to claim 3, in which the metal powder comprises, approximately, 79% copper, 20% tin, and 1% lead.

5. An electric resistor having a molded resistor body and rigid metal terminals integrally secured thereto, the terminals being formed entirely from metal powder consisting essentially of copper powder molded in situ simultaneously with the resistor body.

6. An electric resistor having integral conducting end portions suitable for the making of electrical connections thereto by dip soldering, said resistor comprising a molded elongated resistance body of uniform shape and dimension throughout its length and integrally formed metal end portions of similar shape and dimension, the metal end portions being composed essentially of a mixture of metal powders comprising copper powder and tin powder molded in situ on the resistance body.

7. An electric resistor having a molded resistor body composed essentially of a mixture of conducting material of high specific resistance, a filler, and a binder, and metal terminals integrally secured to the resistor body to which electric connections can be made by soldering, the terminals being formed in situ and consisting essentially of solderable metal powder molded simultaneously with the resistor body.

References Cited in the file of this patent

UNITED STATES PATENTS

| | | |
|---|---|---|
| 1,816,194 | Power | July 28, 1931 |
| 1,896,853 | Taylor | Feb. 7, 1933 |
| 1,910,884 | Comstock | May 23, 1933 |
| 2,175,899 | Kelly | Oct. 10, 1939 |
| 2,255,120 | Kiefer et al. | Sept. 9, 1941 |
| 2,279,445 | Clancy | Apr. 14, 1942 |
| 2,313,853 | Veley | Mar. 16, 1943 |
| 2,399,773 | Waintrob | May 7, 1946 |
| 2,462,906 | Sauerborn | Mar. 1, 1949 |
| 2,496,346 | Haayman et al. | Feb. 7, 1950 |
| 2,559,077 | Johnson et al. | July 3, 1951 |
| 2,638,523 | Rubin | May 12, 1953 |